March 1, 1949.　　　E. E. ARNOLD ET AL　　　2,463,012
SYNCHRONIZED PLANETARY REVERSING GEARING
Filed Aug. 30, 1946　　　　　　　　　　　4 Sheets-Sheet 2
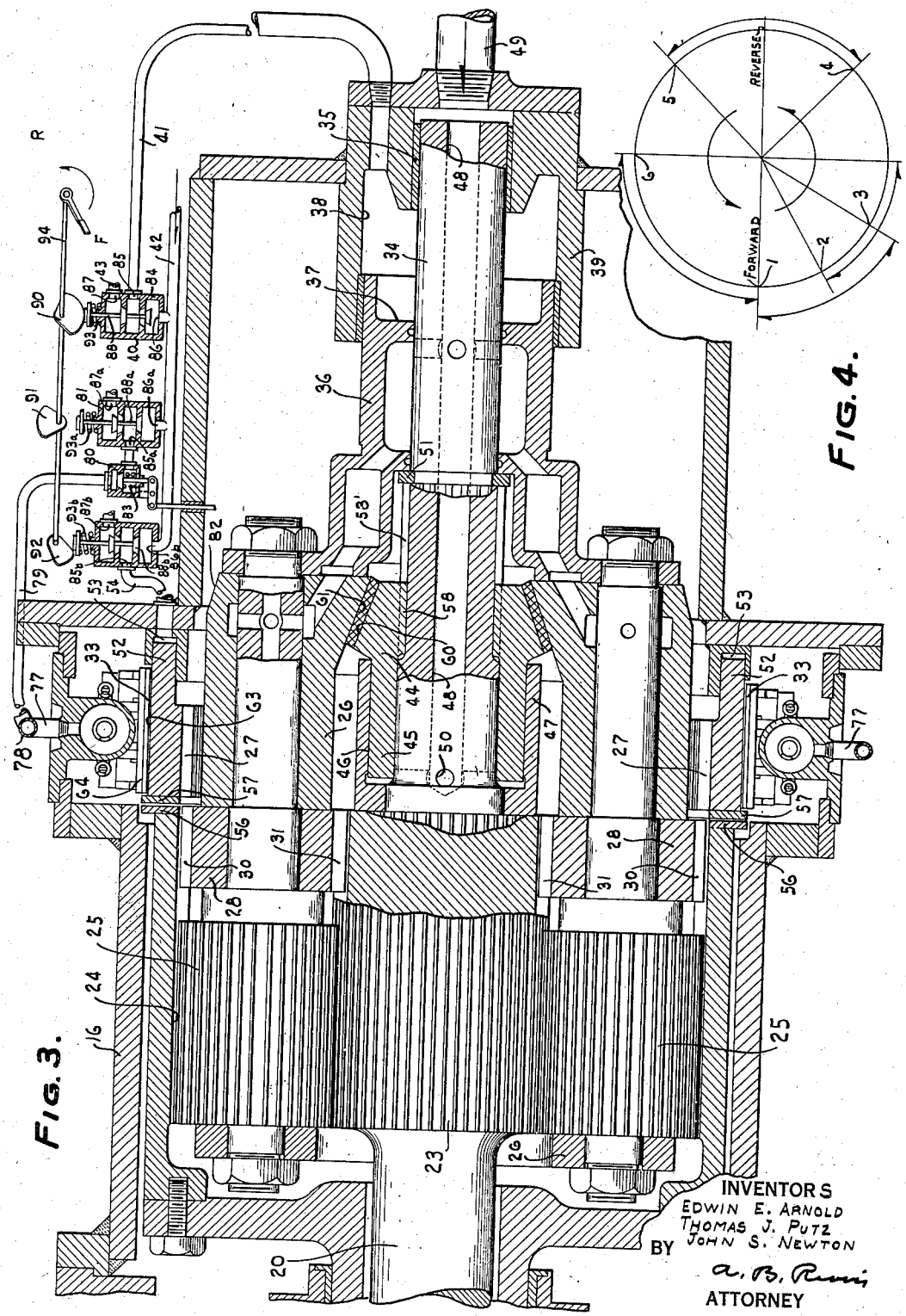

Patented Mar. 1, 1949

2,463,012

UNITED STATES PATENT OFFICE 2,463,012

SYNCHRONIZED PLANETARY REVERSING GEARING

Edwin E. Arnold, Pittsburgh, Thomas J. Putz, Upper Darby, and John S. Newton, Lansdowne, Pa., assignors to Westinghouse Electric Corporation, East Pittsburgh, Pa., a corporation of Pennsylvania Application August 30, 1946, Serial No. 693,968

10 Claims. (Cl. 74—844)

The invention relates to planetary reversing gearing wherein the planet pinion carrier is locked, to the sun and orbit gears, for driving in a forward direction at turbine speed and, to an anchor or fulcrum gear, for driving in a reverse direction at a reduced speed by means of an annulus having external teeth for meshing either with the orbit or ring gear or with the anchor or fulcrum gear and internal teeth for meshing with the sun gear when the external teeth mesh with the orbit gear.

The invention has for an object, with the anchor gear free to rotate, to synchronize the latter gear with the orbit gear incident to shifting the annulus from engagement with the orbit gear to engagement with the anchor gear, to synchronize the carrier with the sun gear incident to shifting the annulus from engagement with the anchor gear to engagement with the sun and orbit gears, and, with the annulus meshing with the anchor gear, to clutch or brake the latter against rotation.

A further object of the invention is to provide apparatus of the above character wherein synchronization is effected by engageable friction surfaces provided on the orbit and anchor gears and on the planet carrier and the sun gear together with hydraulic means for engaging the friction surfaces of the anchor and orbit gears and means for engaging the planet carrier and sun gear friction surfaces incident to shifting the toothed annulus from reverse to forward position.

A further object of the invention is to provide apparatus of the above character wherein the toothed annulus is shifted from forward to reverse position or vice versa by hydraulic means acting on the planet carrier to shift the latter.

Another object of the invention is to provide the planet carrier with a piston area acted upon by fluid under pressure to move the carrier from reverse to forward position and to provide a sleeve member arranged to abut the carrier and having an annular piston area to which lubricating oil or other fluid under pressure is applied to move the carrier from forward to reverse position when the space for the first piston area is connected to drain.

A further object of the invention is to have the aforesaid sleeve member slidably splined in relation to the sun gear and to provide for abutment of the sleeve member and the carrier by means of conical frictional surfaces which operate to synchronize the sun gear and the carrier incident to shifting of the latter from reverse to forward position.

Another object of the invention is to provide the fulcrum or anchor gear with an annular piston area to which liquid under pressure is applied to engage adjoining frictional surfaces of the anchor and orbit gears to synchronize such gears and to provide a brake which is operative to hold the anchor gear against rotation when the carrier is in reverse position.

A further object of the invention is to provide for shifting of the planet carrier by means including a valve, which, in one position, supplies fluid under pressure to the carrier piston area space to shift the carrier from reverse to forward position and, in another position, connects such space to drain so that lubricating oil pressure continuously acting on another piston area is effective to move the carrier from forward position to reverse position.

A further object of the invention is to provide for operation of the anchor gear brake by the controlling means for the aforesaid valve so that, with the carrier in reverse position, the brake is applied.

Another object is to provide for application of fluid pressure to engage the synchronizing friction surfaces of the anchor and orbit gears under control of the controlling means of said valve and the brake so that, with the carrier in forward position, the operation of shifting from ahead to reverse position is initiated by application of fluid under pressure to engage said friction surfaces.

The foregoing and other objects are effected by the invention as will be apparent from the following description and claims taken in connection with the accompanying drawings, forming a part of this application, in which:

Fig. 3 is a longitudinal sectional view of the reversing transmission with the parts in direct or forward drive position;

Fig. 4 is a cycle diagram;

Figure 1:
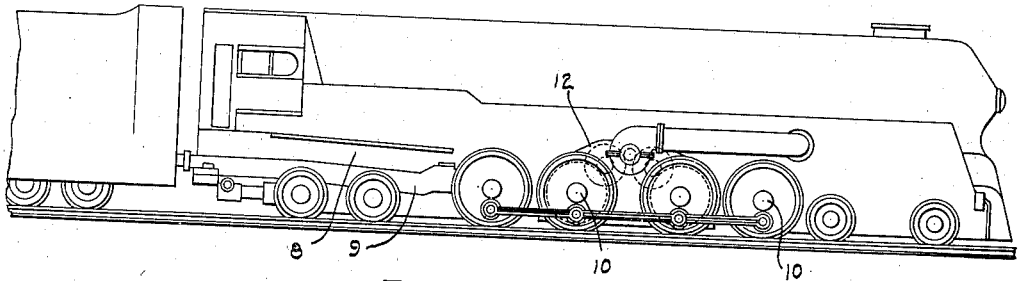
Fig. 1 is an elevational view showing the invention applied to a locomotive.
Figure 2:
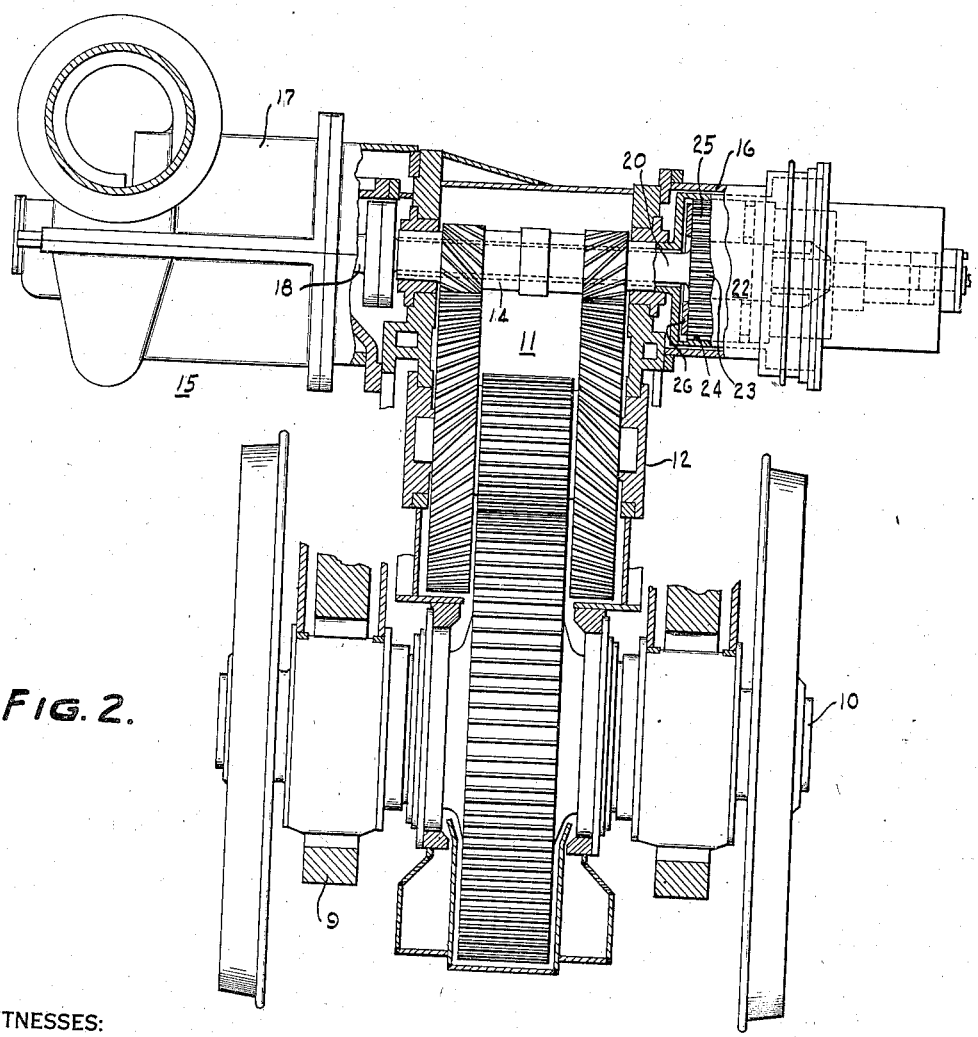
Fig. 2 is a transverse view, partly in section and partly in elevation, showing the invention applied between the turbine and the reduction gearing for driving the locomotive.

In Figs. 1 and 2, there is shown a locomotive 8 having a frame 9 supported by axles including driving axles 10. Power is transmitted to the driving axles by reduction gearing, at 11, rotatably supported by the housing 12 carried by the frame 9. The reduction gearing includes a quill pinion 14 and the housing supports a turbine, at 15, and a gear casing 16 adjacent to opposite ends of the quill pinion and in axial alignment with the latter.

The turbine includes a casing 17 attached to the housing and rotatably supporting the rotor 18 driving a quill shaft 20 extending through the quill pinion. The end of the quill shaft remote from the turbine is connected to the adjacent end of the quill pinion by planetary forward and reverse gearing, at 22, in the gear casing 16.

The forward and reverse gearing, at 22, includes a sun gear 23, an internal ring or orbit gear 24, planet pinions 25 meshing with the sun and ring gears, a carrier 26 for the planet pinions, an anchor or fulcrum gear 27 of the same pitch diameter as the orbit gear and axially aligned with the latter. The carrier has an annulus 28 provided with external teeth 30 and internal teeth 31. The turbine-driven quill shaft 20, extending through the quill pinion, is connected to the sun gear 18, and the orbit gear 24 is connected to one end of the quill pinion 14.

With the planet pinions 25 remaining in mesh with the sun and orbit gears 23 and 24, the annulus 28 is shiftable to forward driving position, in which its external and internal teeth 30 and 31 mesh with the sun and orbit gears, or to reverse driving position, in which its external and internal teeth are disengaged from the sun and orbit gears and its external teeth 30 are engaged with the teeth of the anchor or fulcrum gear 27.

A brake 33 is operative to clutch the anchor or fulcrum gear 27 to the gear casing 16 so that, with the annulus 28 meshing with the anchor gear and the latter held against rotation by the brake, the planet pinions 25 rotate about their axes to drive the orbit gear 24 in a direction opposite to that of the sun gear 23.

The planet carrier 26 is shifted to forward and reversing positions hydraulically. To this end, the sun gear has a shaft extension 34 whose outer end is carried by the bearing 35 attached to the gear casing. The carrier has a tubular body 36 slidable on the extension. Movement of the carrier from reversing to forward position is effected by fluid under pressure applied to the plunger portion 37 of the tubular body, the plunger portion cooperating with the annular cylinder 38 defined by the shaft extension and the bearing housing 39. A valve 40 is operative to place the cylinder supply passage 41 in communication either with the conduit 42 supplied with fluid under pressure or with the drain passage 43. With the carrier in reversing position (Fig. 5), the valve is operated to supply fluid under pressure to the cylinder 38 to move the carrier to forward position (Fig. 3).

Movement of the carrier from forward position (Fig. 3) to reversing position (Fig. 5) is effected by a sleeve element 44 having abutment relation with the carrier and provided with an annular plunger portion 45 to which oil under pressure is continuously applied, the annular plunger portion cooperating with the cylinder 46 defined between the shaft extension 34 and a sleeve 47 attached to the latter adjacent to the sun gear. The shaft extension 34 has a bore 48 communicating with the pressure lubricating oil supply line 49 and a port or ports 50 for opening into the cylinder 46.

Lubricating oil under substantially constant pressure entering the system through connection 49 serves the dual purpose of lubricating all parts through a system of oil ducts and also of keeping the cylinder 46 at all times full and under constant pressure to control the relative movement of sleeve 44 in the cylinder 46 when pressure is released or admitted to cylinder 38.

With the carrier in forward position (Fig. 3), if the valve 40 is operated to connect the cylinder 38 with the drain 43, then the pressure of the fluid applied to the plunger 45 is effective to move the carrier. The plunger sleeve continues to push the carrier until the latter reaches reversing position (Fig. 5) where the sleeve element engages a collar 51 on the shaft extension 34, thereby allowing the carrier in reversing position to operate freely of sleeve element pressure. When the carrier is moved from reversing to forward position by application of fluid pressure to the plunger 37, as aforesaid, the carrier and the sleeve element plunger 45 move against the fluid pressure continuously maintained in the cylinder 46.

With the carrier in forward position and the annulus 28 meshing with the sun and orbit gears 23 and 24, it is desirable to synchronize the orbit and anchor gears 24 and 27 to avoid clashing incident to meshing of the annulus with the anchor gear. To this end, the anchor gear 27 has an annular plunger 52 fitting a casing structure annular cylinder 53 to which fluid under pressure is supplied by the passage 54 having a control valve 55.

With the brake 33 released, the valve 55 is opened to supply fluid under pressure to the cylinder 53 to exert thrust on the anchor gear 27 causing the friction faces 56 and 57 of the orbit and anchor gears to be engaged under pressure so that the anchor gear is rotatable with the orbit gear to condition it for meshing with the annulus 28 without clashing. After the annulus starts to mesh with the anchor gear, the valve 55 is operated to cut off the supply of liquid under pressure to the cylinder 53.

In shifting from reverse to forward position, the sun gear 23 and the carrier 26 should be synchronized. To this end, the tubular element 44 has an internal splined section 58 slidably engaged with a complementary external splined section 58' of the shaft 34. The tubular element 44 and the carrier 26 engage through the conical friction surfaces 60 and 61. As shifting begins, the running clearance existing between the surfaces 60 and 61, because of engagement of the tubular element 44 with the collar 51 when the parts are in reverse position, is taken up, whereupon the surfaces are engaged frictionally, due to continued thrust exerted on the tubular element 44 on account of the fluid pressure applied to the plunger portion 45, to cause the sun gear and the carrier to rotate together, thereby enabling meshing of the annulus 28 with the sun and orbit gears without clashing.

Figure 5:
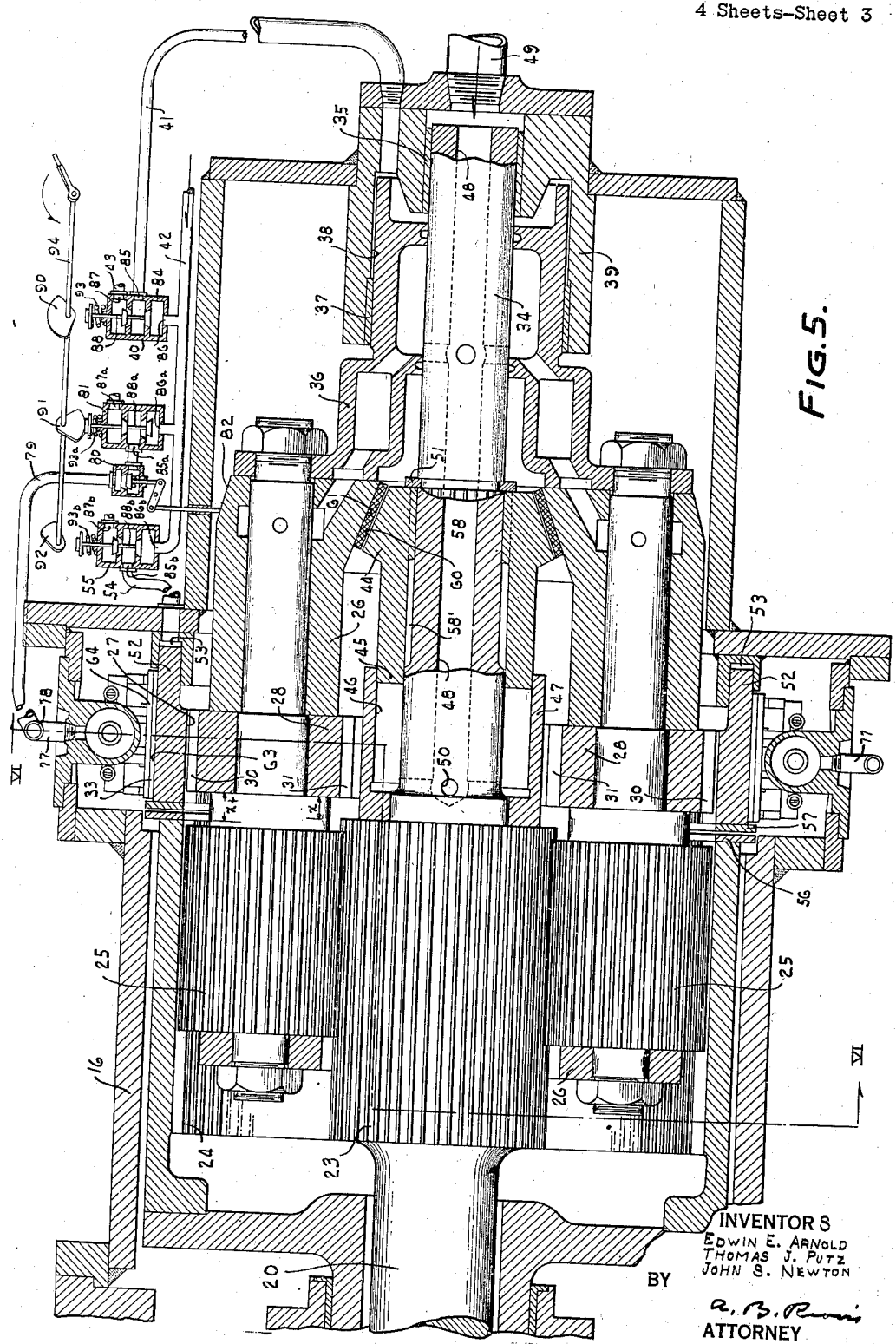
Fig. 5 is a view similar to Fig. 3 but showing the parts in reverse driving position.

Preferably, the sun gear is slightly longer than the orbit gear so that the annulus begins to mesh with the former before the latter. This relation is shown in Fig. 5 wherein the clearance $x$ between the sun gear 23 and the annulus 28 is somewhat smaller than the clearance $x$ between the annulus and the orbit gear 24.

Figure 6:
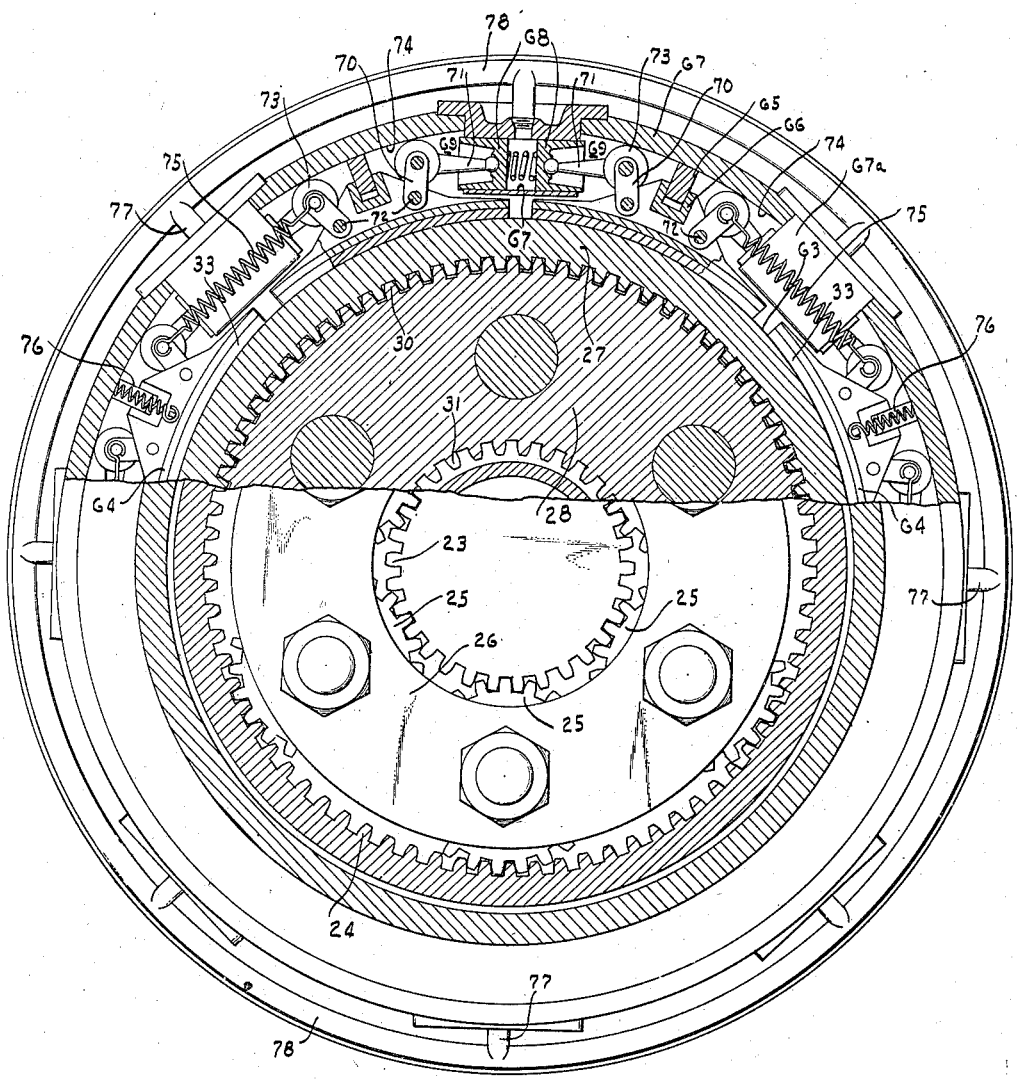
Fig. 6 is a transverse sectional view showing the brake for the anchor gear.

The brake 33 may be of any suitable kind. As shown, it is of the type disclosed and claimed in the application of Arnold, Serial No. 685,839, filed July 24, 1946. The periphery of the anchor gear is formed to provide a brake drum 63 with which a circumferential series of brake shoes 64 cooperate. The shoes are connected to the gear casing by torque-resisting couplings comprised by tongue and slot elements 65 and 66 (Fig. 6) which provide for the necessary inward and outward movements of the shoes. The gear casing is formed with a cylindrical wall 67 encompassing the drum and supporting both the tongue elements 65 and the circumferential series of cylinders 67a. Each cylinder has a pair of pistons 68—68 therein and the pistons operate mechanisms, at 69, to exert braking effort on adjacent end portions of adjacent shoes. Preferably, each mechanism, at 69, is comprised by a toggle lever 70 connected by a link 71 to a piston. The toggle levers are pivoted at 72 to the shoes and the outer ends thereof have rollers 73 bearing against the cylindrical cam surface 74 formed on the wall 67. As the length of each lever from the axis of its pivot to its outer end is greater than the radial distance from such axis to the cam surface, it will be apparent that outward movement of the pistons traverses the rollers along the cam surfaces to produce inward movement of the inner ends of the links and of the shoes to effect braking. Springs 75 connect adjacent toggle links of adjacent shoes and they are effective to retract such links and return the pistons so that the springs 76 are free to move the shoes outwardly to clear the brake drum.

The cylinder spaces between pistons are connected by branch passages 77 to the manifold 78 supplied with fluid under pressure through the conduit 79 and the valves 80 and 81 from the pressure supply line 42. When liquid under pressure is supplied to the manifold, the latter, in turn, supplies fluid under pressure in parallel to the cylinders to actuate the pistons for equalized braking effort of the shoes.

To shift the planet carrier to forward position and hold it there, requires that a greater force than is continuously being exerted on the piston face of tubular element 44. Therefore, when cylinder 38 is supplied with oil under similar pressure, the greater area of piston 37 supplies the necessary force not only to overcome the force on the plunger 45 but to shift the whole carrier and parts into the desired forward position. To shift the carrier to reverse position, the cylinder 38 is connected to the exhaust whereupon the lubricating oil pressure acting on the plunger 45 is effective to move the carrier to reverse position and hold it there.

Since the anchor gear should be synchronized with the orbit gear before the annulus begins to mesh with the anchor gear and since the brake should be applied only with the transmission in reverse position, it is necessary to correlate synchronizing and braking to shifting. Therefore, with the transmission in forward position, to shift to reverse, the valve 55 is operated to supply pressure to the synchronizing cylinder 53 before the valve 40 is operated to connect the cylinder 38 to the exhaust, with the result that the anchor gear is shifted to engage the friction surfaces 56 and 57 to synchronize the gears with the transmission still in forward position. With synchronizing maintained by continued application of pressure, the cylinder 38 is connected to exhaust for shifting from forward to reverse, and the annulus begins to mesh with the anchor gear without clashing. To assure that the brake is applied only with the transmission in reverse, the brake pressure supply line has a normally closed stop valve 80 opened by the carrier with the latter in reverse position, the valve having an actuating rod 80a movable by the carrier cam surface 82 to open the valve against the force of the spring 83.

The valves 40, 81 and 55 are similar in that each has a housing provided with a cylinder port placed in communication with a pressure port or an exhaust port by a movable valve member. For example, the valve 40 includes a body 84 having a cylinder port 85, a pressure port 86 and an exhaust port 87 and a movable valve member 88 cooperating with the ports. In like manner, the valves 81 and 55 have cylinder ports 85a and 85b, pressure ports 86a and 86b and exhaust ports 87a and 87b with which the movable valve members 88a and 88b cooperate. The pressure cylinder ports 85, 85a and 85b are open to the cylinder supply lines 41, 79 and 54, respectively, and the pressure ports 86, 86a and 86b are connected to the common pressure supply line 42.

The valve members 88, 88a and 88b are moved in the order required by any suitable means. For example, such members are shown as being movable by springs for cylinder and exhaust port communication and by cams 90, 91 and 92 acting against the springs 93, 93a and 93b for cylinder and pressure port communication. The cams are constructed and operated so that the required cycle of operations occurs in shifting from forward to reverse and vice versa. To this end, the cams are timed relatively by having them suitably mounted on a common cam shaft 94 and they have the arcuate extents required for the operations described.

Referring to Fig. 3 and to the circle diagram of Fig. 4, in forward driving position of the transmission, the cam 90 is active to supply liquid under pressure to the cylinder 38 to hold the carrier in forward position. Shifting from forward to reverse is initiated by counterclockwise movement of the cam shaft 94 to render the synchronizing cam 92 active, such activity beginning at "1"; and, as the cam 90 remains active, it is assured that synchronization of the orbit and anchor gears shall start with the carrier in forward position. At "2," the shift cam 90 ceases to be active, whereupon lubricating oil acting on the plunger 45 is effective to shift the carrier from forward to reverse position. To assure of synchronizing of the orbit and anchor gears during motion of the carrier to establish the meshing relation of the annulus and the anchor gear, the cam 92 has sufficient arcuate extent that it remains active after activity of the cam 90 ceases, the cam 90 ceasing to be active at "2" and activity of cam 92 continuing until "3" is reached. While the brake cam 91 is active from "4" to "5," nevertheless, such activity is ineffective to apply the brake until the stop valve 80 is opened by the carrier as the latter reaches reverse position. With the transmission in reverse, the carrier being in reverse position and the brake being applied, to shift the carrier to forward position, counterclockwise movement of the cam shaft is continued to render the brake cam inactive at "5," whereupon, with the carrier still in reverse position, the brake is released. Thereafter, by continued movement of the cam shaft 94, the cam 90 is rendered active at "6" to supply liquid under pressure to the cylinder 38 to shift the carrier from reverse to forward position. Release of the brake before carrier shifting begins assures that the anchor gear shall be free to turn with the carrier as the latter is synchronized with the sun gear by engagement of the friction surfaces 60 and 61.

While the valves have been described as being operated by cams, it is to be understood that they may be operated in any suitable manner so long as it is assured that synchronizing of the orbit and anchor gears shall begin with the carrier in forward position and that the brake shall be applied only while the carrier is in reverse position.

While the invention has been shown in but one form, it will be obvious to those skilled in the art that it is not so limited, but is susceptible of various changes and modifications without departing from the spirit thereof.

What is claimed is:

1. In a forward and reverse gearing, a casing for the gearing; a sun gear; an orbit gear; planet pinions meshing with the sun and orbit gears; a carrier for the planet pinions; an anchor gear rotatably carried by the casing; a brake for clutching the anchor gear to the casing; a toothed ring rotatable with the carrier and movable to a forward position in which teeth thereof mesh with the orbit gear teeth and are out of mesh with the anchor gear teeth and movable to a reversing position in which such teeth thereof mesh with the anchor gear teeth and are out of mesh with the teeth of the orbit gear; means for moving the ring to forward and reverse driving positions; means effective, with the brake released, to synchronize the anchor gear with the orbit gear incident to initiating engagement of ring teeth with anchor gear teeth; and means effective, with the ring in reversing position only, to apply the brake to clutch the anchor gear to the casing.

2. In forward and reverse gearing, a casing for the gearing; a sun gear; an orbit gear; planet pinions meshing with the sun and orbit gears; a carrier for the planet pinions; an anchor gear rotatably carried by the casing; a brake for clutching the anchor gear to the casing; an internally and externally toothed ring rotatable with the carrier and movable to a forward position in which the internal teeth mesh with the sun gear teeth and the external teeth mesh with the orbit gear teeth and are out of mesh with the anchor gear teeth and movable to a reversing position in which the internal teeth are out of mesh with the sun gear and the external teeth mesh with the anchor gear teeth and are out of mesh with the teeth of the orbit gear; means for moving the ring to forward and reverse driving positions; means effective, with the brake released, to synchronize the ring with the sun gear incident to initiating engagement of the ring internal teeth with the sun gear teeth; and means effective, with the ring in reversing position only, to apply the brake to clutch the anchor gear to the casing.

3. In forward and reverse gearing, a casing for the gearing; a sun gear; an orbit gear; planet pinions meshing with the sun and orbit gears; a carrier for the planet pinions; an anchor gear rotatably carried by the casing; a brake for clutching the anchor gear to the casing; an internally and externally toothed ring rotatable with the carrier and movable to a forward position in which the internal teeth mesh with the sun gear teeth and the external teeth mesh with the orbit gear teeth and are out of mesh with the anchor gear teeth and movable to a reversing position in which the internal teeth are out of mesh with the sun gear teeth and the external teeth mesh with the anchor gear teeth and are out of mesh with the teeth of the orbit gear; means for moving the ring to forward and reverse driving positions; means effective, with the brake released, to synchronize the anchor gear with the orbit gear incident to initiating engagement of ring teeth with anchor gear teeth and to synchronize the ring with the sun gear incident to initiating engagement of ring teeth with the sun gear teeth; and means effective, with the ring in reversing position only, to apply the brake to clutch the anchor gear to the casing.

4. In single speed forward and reduced-speed reverse gearing, a gear casing; a sun gear; an orbit gear; planet pinions continuously meshing with the sun and orbit gears; an anchor gear of the same pitch diameter as the orbit gear and aligned with the latter; a brake carried by the casing for holding and releasing the anchor gear; a planet carrier for the planet pinions and provided with an annulus having external teeth of the same pitch diameter as the orbit and anchor gears and internal teeth of the same pitch diameter as the sun gear; means for shifting the planet carrier to a forward driving position in which the annulus meshes with the orbit and sun gears and to a reverse driving position in which the annulus meshes with the anchor gear; means effective, with the anchor gear brake released, to synchronize the anchor gear with the orbit gear before the annulus begins to mesh with the anchor gear and while still meshing with the sun and orbit gears; means effective, with the anchor gear brake released, to synchronize the planet carrier with the sun gear before the annulus begins to mesh with the latter and while still meshing with the anchor gear; and means for applying the brake so that, with the annulus meshing with the anchor gear and free of the sun and orbit gears, the anchor gear may be clutched to the gear casing to hold the planet carrier against rotation and thereby cause, due to rotation of the sun gear, the planet pinions to rotate about their axes to drive the orbit gear in a direction opposite to that of the sun gear.

5. In forward and reverse planetary gearing, a sun gear; an orbit gear; an anchor gear aligned with the orbit gear and of the same pitch diameter as the latter; planet pinions meshing with the sun and orbit gears; a carrier for the planet pinions; an annulus rotatable with the carrier and having external and internal teeth; means for shifting the annulus to forward driving position in which the external teeth thereof mesh with the orbit gear and the internal teeth thereof mesh with the sun gear and for shifting the annulus to reverse driving position in which the external teeth thereof mesh with the anchor gear and the internal teeth thereof are free of the sun gear; a brake cooperating with the anchor gear; said orbit and anchor gears having adjacent friction surfaces; means for shifting the anchor gear to engage said friction surfaces to cause the anchor gear to rotate with the orbit gear before the annulus, while still meshing with the sun and orbit gears, begins to mesh with the anchor gear; means rotatable with the sun gear and the annulus and provided with friction surfaces engageable to cause the sun gear, the annulus and carrier to rotate together; means providing for operation of the last-named means to engage the friction surfaces thereof before the annulus meshes with the sun gear so that the annulus, while meshing with the anchor gear, may be brought into meshing relation with the sun gear without clashing; and means providing for operation of the brake to apply and release the latter so that, with the annulus and anchor gear meshed, the anchor gear may be held against rotation.

6. In forward and reverse planetary gearing, a sun gear; an orbit gear; an anchor gear aligned with the orbit gear and of the same pitch diameter as the latter; planet pinions meshing with the sun and orbit gears; a carrier for the planet pinions; a casing enclosing the sun, orbit and anchor gears, the planet pinions, and the planet pinion carrier; said planet pinion carrier including an annulus having external and internal teeth; means for shifting the carrier to forward driving position in which the annulus meshes with the orbit and sun gears and to reverse driving position in which the annulus meshes with the anchor gear; a shaft extension unitary with the sun gear; means carried by the casing and cooperating with the shaft extension to provide a first annular cylinder; an annular plunger unitary with the planet carrier and cooperating with the first annular cylinder; a sleeve attached to the shaft extension and cooperating with the latter to provide a second annular cylinder extending in opposed relation to the first annular cylinder; a tubular element for abutment with the carrier and having a plunger portion fitting the second annular cylinder; means for continuously supplying fluid under pressure to the second annular cylinder; and means including a valve movable to place the first annular cylinder in communication with a supply of fluid under pressure to move the carrier to forward driving position against the opposition of fluid under pressure supplied to the second annular cylinder and movable to place the first annular cylinder in communication with a drain or exhaust port so that pressure of fluid supplied to the second annular cylinder is effective to move the tubular element to move the carrier to reversing driving position.

7. In forward and reverse planetary gearing, a sun gear; an orbit gear; an anchor gear aligned with the orbit gear and of the same pitch diameter as the latter; planet pinions meshing with the sun and orbit gears; a carrier for the planet pinions; a casing enclosing the sun, orbit and anchor gears, the planet pinions and the carrier; said planet carrier including an annulus having external and internal teeth; means for shifting the carrier to forward driving position in which the annulus meshes with the orbit and sun gears and to reverse driving position in which the annulus meshes with the anchor gear; a shaft extension unitary with the sun gear; means carried by the casing and cooperating with the shaft extension to provide a first annular cylinder; an annular plunger unitary with the planet carrier and cooperating with the first annular cylinder; a sleeve attached to the shaft extension and cooperating with the latter to provide a second annular cylinder extending in opposed relation to the first annular cylinder; a tubular element for abutment with the carrier and having a plunger portion fitting the second annular cylinder; means for continuously supplying fluid under pressure to the second annular cylinder; means including a valve movable to place the first annular cylinder in communication with a supply of fluid under pressure to move the carrier to forward driving position against the opposition of fluid under pressure supplied to the second annular cylinder and to place the first annular cylinder in communication with a drain or exhaust port so that the pressure of fluid supplied to the second annular cylinder is effective to move the carrier to reverse driving position; means for rotatably mounting the anchor gear with respect to the casing and in coaxial relation with the orbit gear; and a brake mounted on the casing and operative to hold the anchor gear against rotation.

8. In forward and reverse planetary gearing, a sun gear; an orbit gear; an anchor gear aligned with the orbit gear and of the same pitch diameter as the latter; planet pinions meshing with the sun and orbit gears; a carrier for the planet pinions; a casing enclosing the sun, orbit and anchor gears, the planet pinions and the carrier; said planet carrier including an annulus having external and internal teeth; means for shifting the carrier to forward driving position in which the annulus meshes with the orbit and sun gears and to reverse driving position in which the annulus meshes with the anchor gear; a shaft extension unitary with the sun gear; means carried by the casing and cooperating with the shaft extension to provide a first annular cylinder; an annular plunger unitary with the planet carrier and cooperating with the first annular cylinder; a sleeve attached to the shaft extension and cooperating with the latter to provide a second annular cylinder extending in opposed relation to the first annular cylinder; a tubular element having abutment relation with the planet carrier, provided with a splined connection with respect to the shaft extension, and having a plunger portion fitting the second annular cylinder; means for continuously supplying fluid under pressure to the second annular cylinder; means including a valve movable to place the first annular cylinder in communication with a supply of fluid under pressure to move the carrier to forward driving position against the opposition of fluid under pressure supplied to the second annular cylinder and, with the carrier in forward driving position, to place the first annular cylinder in communication with a drain or exhaust port so that the pressure of fluid supplied to the second annular cylinder is effective to move the tubular element to move the carrier to reversing driving position; means for rotatably mounting the anchor gear with respect to the casing and in coaxial relation with the orbit gear; a brake engageable with the anchor gear to hold the planet carrier against rotation when the latter is in reverse driving position; said orbit and anchor gears having adjacent friction surfaces; means effective, with the brake released, to shift the anchor gear to engage the friction surfaces so that the anchor gear may rotate with the orbit gear before the annulus, while meshing with the sun and orbit gears, begins to mesh with the anchor gear; said tubular element and the planet carrier having friction surfaces which are engageable for rotation of the sun gear and the carrier together before the annulus, while meshing with the anchor gear and with the brake released, begins to mesh with the sun gear; and a collar carried by the shaft extension and engageable by the tubular element as movement of the carrier to reverse position is completed to free the carrier from thrust engagement with the tubular element.

9. In forward and reverse planetary gearing, a sun gear; an orbit gear; planet pinions meshing with the sun and orbit gears; a carrier for the planet pinions; an anchor gear aligned with the orbit gear; a toothed ring rotatable with the carrier and shiftable to mesh teeth thereof either with the orbit gear or with the anchor gear; a brake for the anchor gear; first hydraulic means for shifting the ring; said orbit and anchor gears having engageable friction surfaces; second hydraulic means for exerting lateral thrust on the anchor gear to engage the friction surface thereof with the orbit gear friction surface for rotation of such gears together; and means for controlling the first and second hydraulic means and the brake so that, with the first hydraulic means positioning the ring in mesh with the orbit gear, the second hydraulic means is rendered effective to cause the anchor gear to rotate with the orbit gear before the first means is operated to shift the ring to mesh with the anchor gear and so that the brake is applied only when the ring meshes with the anchor gear alone.

10. In forward and reverse planetary gearing, a sun gear; an orbit gear; planet pinions meshing with the sun and orbit gears; a carrier for the planet pinions; an internally and externally toothed annulus rotatable with the carrier and shiftable to engage the internal and external teeth thereof with the sun and orbit gears, respectively, or to engage the external teeth with the anchor gear; a brake for the anchor gear; said orbit and anchor gears having friction surfaces which are engageable to cause the anchor gear to rotate with the orbit gear; means rotatable with the sun gear and with the annulus and having friction surfaces which are engageable to cause the annulus to rotate with the sun gear; hydraulic means for shifting the annulus to mesh the internal and external teeth thereof with the sun and orbit gears, respectively, or to mesh the external teeth with the anchor gear and to engage the friction surfaces of said means to cause the annulus to rotate with the sun gear before the annulus begins to mesh with the latter; hydraulic means effective to impart lateral thrust to the anchor gear to engage the friction surfaces thereof and of the orbit gear to cause the anchor gear to rotate with the latter; and means for controlling the first and second hydraulic means and the brake so that, with the first hydraulic means positioning the annulus in mesh with the sun and orbit gears, the second hydraulic means is rendered effective to cause the anchor gear to rotate with the orbit gear before the first means is operated to shift the annulus to mesh with the anchor gear and so that the brake is applied only when the annulus is out of mesh with the sun and orbit gears and meshes with the anchor gear alone.

EDWIN E. ARNOLD.
THOMAS J. PUTZ.
JOHN S. NEWTON.

REFERENCES CITED

The following references are of record in the file of this patent:

UNITED STATES PATENTS

| Number | Name | Date |
|---|---|---|
| 2,349,410 | DeNormanville | May 23, 1944 |

FOREIGN PATENTS

| Number | Country | Date |
|---|---|---|
| 178,437 | Switzerland | Oct. 1, 1935 |